United States Patent Office 2,796,581
Patented June 18, 1957

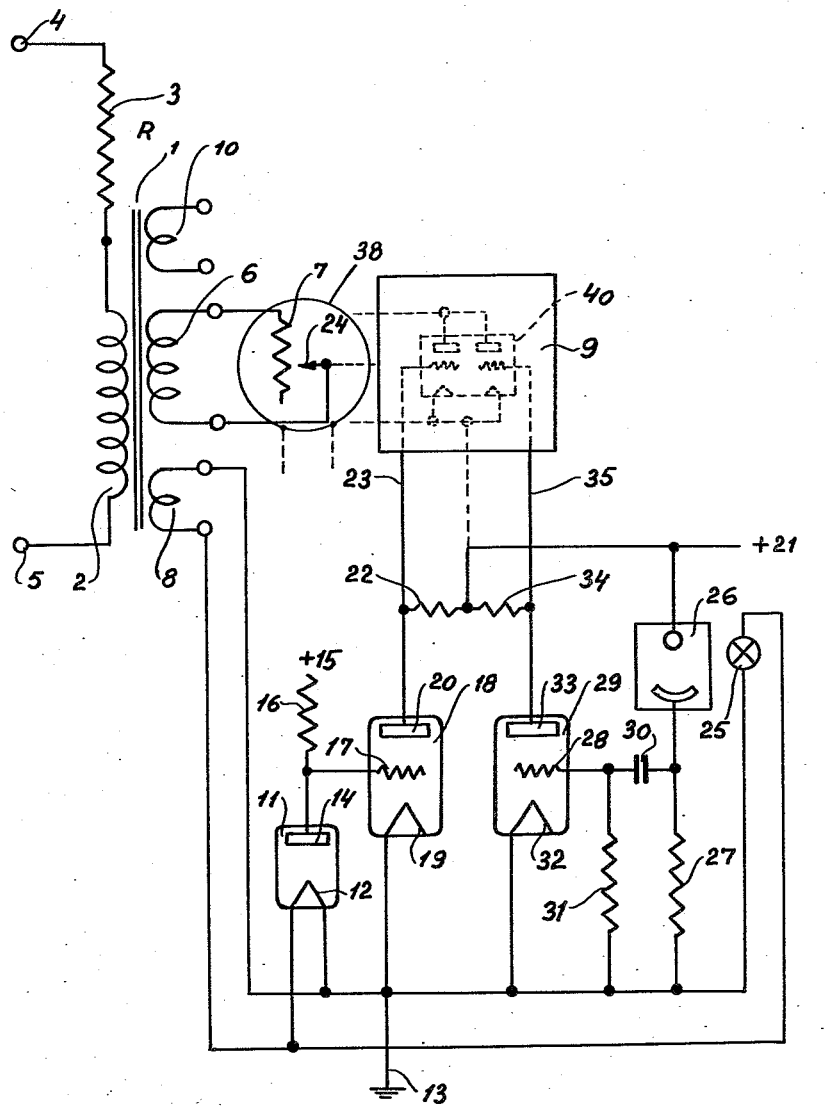

2,796,581

APPARATUS FOR PRODUCING A CONSTANT A. C. VOLTAGE FROM A NON-CONSTANT VOLTAGE SOURCE

Villy Viggo Jørgensen, Copenhagen, Denmark, assignor to H. Struers Chemiske Laboratorium, Copenhagen, Denmark Application July 21, 1953, Serial No. 369,405

Claims priority, application Denmark August 6, 1952

6 Claims. (Cl. 323—50)

In many measuring arrangements it is necessary to have access to a voltage source supplying a very constant voltage. This is e. g. the case in photometer arrangements, where even very small variations of the voltages, from which the light sources are supplied, may result in considerable changes of the values measured.

A great number of apparatuses have been proposed for producing a constant voltage from a network supply voltage, on which voltage variations occur. None of these proposals has proved to be suitable in such cases where a very great accuracy is required, and in measuring arrangements, such as photometer arrangements as above mentioned, it has therefore in many cases been found necessary to employ an individual battery such as an accumulator battery for the current supply.

It is the object of the present invention to devise an apparatus that, starting from a supply network voltage, on which voltage variations occur within reasonable limits, is capable of supplying a voltage which is constant within limits of accuracy which are satisfactory even for very critical measuring arrangements, such as photometer arrangements.

According to the invention, an apparatus for the purpose described comprises a transformer having an impedance included in the primary circuit thereof, and having a variable load controlled via amplifying means from a test voltage taken out from the transformer.

In an apparatus as set forth, an increasing supply voltage will initially result in an increase of the transformer voltage. Concurrently with the latter the test voltage is increased, and by way of the amplifying means the load circuit is now controlled in such a manner that a higher current flows through the transformer and consequently through the said impedance, whereby the drop of voltage across the latter is increased. The various components and circuits may now be adjusted in such a manner that, within a very small margin, the increase of the voltage drop across the impedance is equal to the increase of the supply voltage, so that, within the said very small margin, the whole of the last named increase is absorbed by the impedance. An adjustment as described is possible because, by means of the amplifying means, the variations of the input voltage may easily be depicted on a scale so much enlarged that the necessary control of the load circuit can be performed dependent thereon.

The test voltage must be caused to operate suitable test arrangements responding to changes of the test voltage. In this connection the problem is encountered that it has been found difficult to find a test arrangement that fulfills all the requirements that should be fulfilled in order to obtain an accurate control for the most delicate circumstances. First, the test arrangement must be highly responsive to changes of the test voltage, and second, it must not in the course of time have its characteristic line displaced whereby the characteristic line for the control of the transformer and thereby the value of the voltage at which the transformer comes to rest would be correspondingly displaced, and third, the test arrangement should be responsive to very fast changes so that it is capable of detecting and compensating for even such surgewise changes of the supply voltage as may e. g. occur when another consumer circuit is switched onto the same supply source.

Particularly it is difficult to find a test arrangement that fulfills both of the two last mentioned requirements simultaneously, and it is, therefore, proposed, according to a preferred embodiment of the invention, to employ a combination of two test arrangements connected to the test voltage to control the load circuit via the amplifying means, one of said test circuits having a relatively high time constant and a constant function over long periods of time, the other test arrangement having a very low time constant and being connected so as to be effective only on rapid voltage changes.

In an apparatus constructed in this manner, the first mentioned test arrangement which has a constant function over long periods will ensure that the average voltage of the transformer will not be changed in the course of time, while the second test arrangement compensates for the inertia of the first test arrangement so that the combined arrangement will be capable of following even very fast variations of the supply voltage.

In a preferred construction of the type set forth, said first named test arrangement comprises an electronic valve connected so as to have its emission controlled by the test voltage, while said last named test arrangement comprises an incandescent lamp connected to the test voltage, and a photo-electric cell receiving light therefrom, the voltages developed by said test arrangements being coupled to said amplifying means.

Both of these test arrangements are very sensitive to voltage variations and will depict the latter on very much enlarged scale, whereafter a further amplification is obtained in the amplifying means inserted between the circuits of the electronic valve and the photo-electric cell on one hand, and the means for controlling the load circuit on the other hand. Moreover, the emission characteristic line of the electronic valve which determines the output voltage of the first test arrangement is very constant, while on the other hand the incandescent lamp may be constructed to have a very small inertia, and the photo-electric cell has practically no inertia at all, so that the combination of the incandescent lamp and the photo-electric cell will correctly reproduce even very fast variations of the test arrangement.

One example of an apparatus according to the invention will in the following be described in further detail with reference to the accompanying drawing showing a circuit diagram of the apparatus.

In the drawing, 1 is a transformer having a primary winding 2 which through a resistor 3 is connected at terminals 4 and 5 to a voltage source, on which voltage variations occur. The transformer has a secondary winding 6, to which there is connected a controllable load circuit symbolized by a variable resistor 7. Moreover, the transformer has a second secondary winding 8, to which there is connected a test arrangement to be described in further detail below, said test arrangement serving to control the load circuit symbolized by the resistor 7 by way of an amplifier 9.

Disregarding the detailed arrangement of the testing system that may be constructed in a multitude of ways and for which a preferred embodiment will be described below, the function is on principle as follows.

Assume that the apparatus is in a state of equilibrium or stable condition at a certain voltage across the terminals 4 and 5 and that, starting from this condition, an increase of the said voltage is initiated. Thereby the voltage across the primary winding 2 will at first be increased, and consequently also the magnetic flux in the transformer core will be increased. Consequently, the test voltage across the secondary winding 8 is also increased. By way of the test arrangement and the amplifier 9, the variation of the test voltage causes the load circuit 7 to be controlled in the direction of an increased load. This increased load has the effect that the current in the primary circut of the transformer is increased. Thereby the voltage drop across the resistor 3 rises. Now, the cooperation between the test voltage and the control of the load circuit is so adjusted that, within a very slight margin, the increase of the voltage drop across the resistor 3 corresponds to the increase of the voltage across the terminals 4 and 5, so that practically the whole of the last named increase is absorbed by the resistor 3, while the voltage across the primary winding 2 remains constant. It is, therefore, possible to take out a practically constant voltage from the transformer, e. g. across a separate secondary winding 10.

Consideration will now be given to the detailed arrangement of the testing means illustrated in the drawing.

11 represents an electronic valve, e. g. a diode, the filament 12 of which is fed from the secondary winding 8. One end of the filament is earthed at 13. The anode 14 of the valve 11 is connected to an anode voltage source +15 through an anode resistor 16 and is also connected to the control grid 17 of an amplifying valve 18, the cathode 19 of which is earthed at 13, while the anode 20 thereof is connected to an anode voltage source +21, that may be the same as the anode source +15, through an anode resistor 22. The anode 20 is also connected through a conductor 23 to the input circuit of the amplifier 9 which in known manner serves to amplify the signals received through the conductor 23 and to utilize the amplified signals in the output of the amplifier 9 for controlling the load circuit 7. The latter is symbolized in the drawing by a variable resistor 7 having an adjustable tap 24. Tap 24 may be, for example, the pointer of an ammeter or voltmeter 38 arranged to establish sliding contact with resistor 7. It should be evident, however, that in practice other adjustable devices, such as electronic systems, would be usable for this purpose. Such electronic systems will not be mentioned in detail because such electronic load control means are well known in the art.

Disregarding, for the time being, the remaining part of the test arrangement, the function is as follows. The cathode 12 of the electronic valve 11 conducts a current, which is determined by the voltage across the secondary winding 8. The number of turns of the winding 8 is so selected that a voltage is produced across the winding suitable for keeping the filament 12 at a current value lying within a range where the electron emission varies very considerably with the heating current. Thus, the voltage variations across the winding 8 are reproduced on a highly enlarged scale in the anode current of the valve 11. Across the resistance 16 the said anode current produces a voltage drop which is applied to the control grid 17 of the valve 18. Also the potential of the control grid 17 will therefore vary considerably with the voltage variation across the winding 8, and the same will therefore also apply to the anode current of the valve 18. Consequently, across the anode resistor 22 there will occur a voltage drop reproducing the voltage variations across the windings 8 on a still more enlarged scale. This is the voltage drop which by way of the conductor 23 is used for controlling the amplifier 9, being e. g. a double triode 40 as indicated in dotted lines, one control grid of which is connected to the conductor 23. The output of this triode serves the purpose of controlling the load 7. Means by which such control is to be effected, would be evident for an expert in the art.

An electronic valve as the valve 11 described has in most respects excellent properties for effecting the control. Among other things it has an emission characteristic line that keeps constant over a long period of time, so that the average control valve is not unduly displaced in the course of time. If the valve also responds rapidly enough to variations of the heating voltage, the test arrangement described will therefore be satisfactory in itself.

However, most of the electronic valves on the market do not fulfil the last named requirement, and a further test arrangement is therefore shown in the drawing, such test arrangement serving to compensate for the inertia in the function of the valve 11. This test arrangement consists of a small incandescent lamp 25 having a low heat capacity of the filament, and a photo-electric cell 26 receiving light from the lamp 25. In the embodiment shown, the latter is connected to the secondary winding 8, but if it should require a voltage different from that of the filament 12, it may of course also be connected to another test winding of the transformer or to a tap on the winding 8. The light emission of the incandescent lamp 25 varies greatly and practically instantaneously with the test voltage. The anode of the photo-electric cell is connected to the anode voltage source +21, while its cathode is connected to earth by way of a coupling resistor 27 which is also coupled to the control grid 28 of an amplifier valve 29 through a capacitor 30 with leak resistance 31. The cathode 32 of the valve 28 is connected to earth at 13, while its anode 33 is connected to the voltage source +21 by way of an anode resistor 34.

In the case of variations of the light emission of the lamp 25, the current through the photo-electric cell 26 varies, and the same applies to the voltage drop across the resistor 27. Rapid voltage variations are admitted through the capacitor 30 to the control grid 28, while slow voltage variations leak away through the resistor 31. The valve 29 has a function exactly similar to that of the valve 28, and the resulting control potential of the anode 33 is supplied through a conductor 35 to the amplifier 9—in the embodiment shown to the second control grid of the double triode—whereby it serves to control the amplifier 9 in addition to the control by way of the conductor 23. The two control effects may e. g. be combined by simple addition or they may be mixed in suitable proportions. The dimensioning and adjustment of the various components are such that the lamp 25 will exactly supply, by way of the photo-electric cell 26 and the amplifier 29, such rapid control signals as are missing from the valve 11 owing to the inertia thereof.

Thus, the two test arrangements combine to supply a control which is both constant over long periods of time and capable of following even rapid variations of the voltage across the terminals 4 and 5 practically without delay.

I claim:

1. An apparatus for producing a constant alternating voltage from a non-constant alternating voltage source comprising a transformer having input terminals connectable to an alternating current supply source, output terminals for the connection of a consumer circuit, a series impedance in the feeding circuit of said transformer, an independent, permanently closed artificial load circuit coupled to said transformer independently of any consumer circuit connected to said output terminals, means for deriving a control voltage representative of the output voltage across said output terminals and means for controlling the load offered by said artificial load circuit in response to said control voltage in such a manner as to subdue variations of the voltage across said output terminals.

2. An apparatus for producing a constant alternating voltage from a non-constant alternating voltage source comprising a transformer having primary and secondary windings, an external impedance connected in series with the primary winding of said transformer, output terminals connected to a secondary winding of said transformer, an artificial load circuit permanently connected to a secondary winding of said transformer independent of any consumer circuit connected to said output terminals, means for deriving a control voltage representative of the output voltage across said output terminals, and means for controlling the load offered by said artificial load circuit in response to said control voltage in such a manner as to subdue variations of the voltage across said output terminals.

3. An apparatus for producing a constant alternating voltage from a non-constant alternating voltage source comprising a transformer having a primary winding and secondary windings, an external impedance connected in series with the primary winding of said transformer, output terminals connected to the ends of a first secondary winding of said transformer, a permanently closed artificial load circuit connected to the ends of a second secondary winding of said transformer, means for deriving a control voltage representative of the output voltage across said output terminals, and means for controlling the load offered by said artificial load circuit in response to said control voltage in such a manner as to subdue variations of the voltage across said output terminals.

4. An apparatus for producing a constant alternating voltage from a non-constant alternating voltage source comprising a transformer having input terminals connectable to an alternating current supply source, output terminals for the connection of a consumer circuit, a series impedance in the feeding circuit of said transformer, an independent, permanently closed artificial load circuit coupled to said transformer independently of any consumer circuit connected to said output terminals, a first sensing circuit for deriving a first control voltage representative of the output voltage across said output terminals, said first sensing circuit having a relatively high time constant and a constant function over long periods of time, a second sensing circuit for deriving a second control voltage representative of the output voltage across said output terminals, said second sensing circuit having a very low time constant, and means for controlling the load offered by said artificial load circuit in response to said first control voltage and to rapid variations of said second control voltage.

5. An apparatus as in claim 4 in which said first sensing circuit comprises an electronic valve connected so as to have its emission controlled by a sensing voltage derived from said transformer and representative of the voltage across the output terminals thereof, and means for deriving a control voltage in response to said emission.

6. An apparatus as in claim 4 and in which said second sensing circuit comprises an incandescent lamp connected to a sensing voltage derived from said transformer and representative of the output voltage across the output terminals thereof, a photoelectric cell receiving light from said incandescent lamp, and means for deriving a control voltage in response to the current carried by said photoelectric cell.

References Cited in the file of this patent

UNITED STATES PATENTS 2,497,218   Hart _____ Feb. 14, 1950

FOREIGN PATENTS 954,956   France _____ June 20, 1949